(12) United States Patent
Kawahara

(10) Patent No.: US 10,880,533 B2
(45) Date of Patent: Dec. 29, 2020

(54) IMAGE GENERATION APPARATUS, IMAGE GENERATION METHOD, AND STORAGE MEDIUM, FOR GENERATING A VIRTUAL VIEWPOINT IMAGE

(71) Applicant: CANON KABUSHIKI KAISHA, Tokyo (JP)

(72) Inventor: Takuto Kawahara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/438,049

(22) Filed: Jun. 11, 2019

(65) Prior Publication Data

US 2019/0394442 A1    Dec. 26, 2019

(30) Foreign Application Priority Data

Jun. 25, 2018 (JP) .................................. 2018-120186
Jun. 25, 2018 (JP) .................................. 2018-120187

(51) Int. Cl.
*H04N 13/111* (2018.01)
*G06T 19/20* (2011.01)

(52) U.S. Cl.
CPC ............ *H04N 13/111* (2018.05); *G06T 19/20* (2013.01); *G06T 2219/2021* (2013.01)

(58) Field of Classification Search
None
See application file for complete search history.

(56) References Cited

U.S. PATENT DOCUMENTS

| | | | |
|---|---|---|---|
| 10,081,370 B2* | 9/2018 | Roth | B60W 50/10 |
| 2010/0228632 A1* | 9/2010 | Rodriguez | G06F 3/0425 |
| | | | 705/14.66 |
| 2011/0187706 A1* | 8/2011 | Vesely | G06F 3/013 |
| | | | 345/419 |
| 2012/0259712 A1* | 10/2012 | Hyndman | G06T 19/006 |
| | | | 705/14.73 |
| 2014/0278847 A1* | 9/2014 | Gallo | G06Q 30/0252 |
| | | | 705/14.5 |
| 2015/0130790 A1* | 5/2015 | Vasquez, II | G06T 19/006 |
| | | | 345/419 |
| 2016/0217604 A1* | 7/2016 | De Roos | G06T 7/70 |

(Continued)

FOREIGN PATENT DOCUMENTS

JP        5567942 B2    8/2014

*Primary Examiner* — Jeffrey J Chow
(74) *Attorney, Agent, or Firm* — Canon U.S.A., Inc. IP Division

(57) ABSTRACT

An image generation apparatus includes an image obtaining unit configured to obtain image data obtained by capturing images of an image capturing region in a plurality of directions with a plurality of image capturing apparatuses, wherein the image capturing region includes a flat specific object which is seen as a 3D object when viewed in a predetermined direction, an information obtaining unit configured to obtain viewpoint information indicating a position and a direction of a virtual viewpoint, a deformation unit configured to deform the specific object by image processing so that the specific object is seen as a 3D object in a virtual viewpoint image corresponding to the position and the direction of the virtual viewpoint indicated by the obtained viewpoint information, and a generation unit configured to generate the virtual viewpoint image based on the obtained image data and a result of the deformation of the specific object.

17 Claims, 13 Drawing Sheets

(56) References Cited

U.S. PATENT DOCUMENTS

| | | | |
|---|---|---|---|
| 2018/0288394 A1* | 10/2018 | Aizawa | H04N 5/2628 |
| 2018/0318709 A1* | 11/2018 | Metelko | A63F 13/655 |
| 2019/0065027 A1* | 2/2019 | Hauenstein | G06F 3/0485 |
| 2019/0188450 A1* | 6/2019 | Spivack | G06K 9/00369 |
| 2019/0206104 A1* | 7/2019 | Rahman | H04L 67/141 |
| 2019/0222776 A1* | 7/2019 | Carter | G06T 19/006 |

* cited by examiner

IMAGE GENERATION APPARATUS, IMAGE GENERATION METHOD, AND STORAGE MEDIUM, FOR GENERATING A VIRTUAL VIEWPOINT IMAGE

BACKGROUND

Field of the Disclosure

The present disclosure relates to a technique of generating a virtual viewpoint image based on images obtained by capturing an object in a plurality of directions.

Description of the Related Art

In recent years, a technique of capturing an image of an object by a plurality of image capturing apparatuses (cameras) in synchronization installed in different positions and generating a virtual viewpoint image corresponding to an arbitrary virtual viewpoint in addition to the installation positions of the image capturing apparatuses using images from a plurality of viewpoints obtained by the image capturing (plural viewpoint images) has been used. For example, a virtual viewpoint image corresponding to a virtual viewpoint specified by a user may be generated using images obtained by capturing a game of a soccer or a basketball so that image content in a viewpoint of a powerful game or a viewpoint desired by the user may be generated. Accordingly, the virtual viewpoint image may give realistic sensation to the user when compared with general images captured without arbitrarily changing a viewpoint. In Japanese Patent No. 5567942 discloses a method for displaying an advertisement in a virtual viewpoint image.

Meanwhile, in general, a sheet including an advertisement printed thereon may be placed on the ground in a game of soccer, for example. This advertisement may be three-dimensionally viewed from a viewpoint of a main camera of television broadcast due to optical illusion. Since such a sheet advertisement is used instead of a physical 3D advertisement, the advertisement may be placed even in a location in the vicinity of a region where players play such that the advertisement does not disturb the play of the players, and accordingly, the advertisement may be effectively displayed for viewers of the television broadcast. Such an advertisement is referred to as a 90° system advertisement, for example, and in this specification, an image, irrespective of whether it is an advertisement or not, which is formed as a substantially flat object and which is seen to be a 3D object utilizing optical illusion is referred to as a stereoscopic illusion image.

When a virtual viewpoint image is generated by a general method based on images obtained by capturing a region including a specific object, such as a stereoscopic illusion image, the specific object may not be displayed in an efficient form in the virtual viewpoint image. For example, since the stereoscopic illusion image is seen to be a 3D image only when viewed from a predetermined direction, if a virtual viewpoint is set in a direction different from the predetermined direction, the stereoscopic illusion image is not viewed as a 3D image and content thereof is difficult to be recognized when the stereoscopic illusion image is displayed.

SUMMARY

According to an embodiment of the present disclosure, an image generation apparatus includes an image obtaining unit configured to obtain image data obtained by capturing images of an image capturing region in a plurality of directions with a plurality of image capturing apparatuses, wherein the image capturing region includes a flat specific object which is seen as a 3D object when viewed in a predetermined direction, an information obtaining unit configured to obtain viewpoint information indicating a position and a direction of a virtual viewpoint, a deformation unit configured to deform the specific object by image processing so that the specific object is seen as a 3D object in a virtual viewpoint image corresponding to the position and the direction of the virtual viewpoint indicated by the obtained viewpoint information, and a generation unit configured to generate the virtual viewpoint image based on the obtained image data and a result of the deformation of the specific object.

Further features of the present disclosure will become apparent from the following description of exemplary embodiments with reference to the attached drawings.

DESCRIPTION OF THE EMBODIMENTS

Hereinafter, the present disclosure will be described in detail based on an embodiment with reference to the accompanying drawings. Note that a configuration illustrated in this embodiment below is merely an example, and the present disclosure is not limited to the illustrated configuration.

Figure 1A:
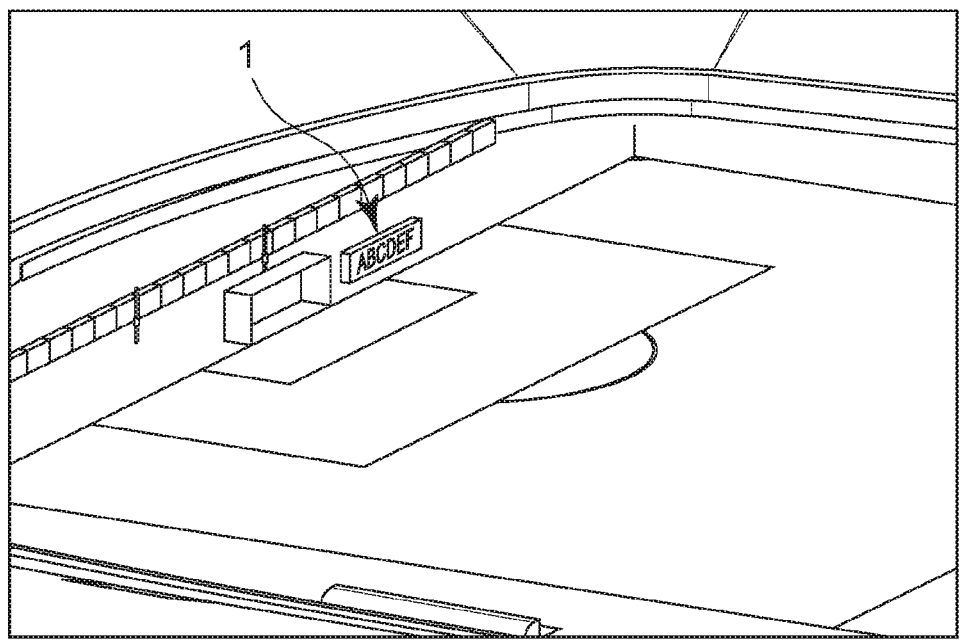
FIGS. 1A to 1C are diagrams illustrating a stereoscopic illusion image according to one or more aspects of the present disclosure.
Figure 1B:
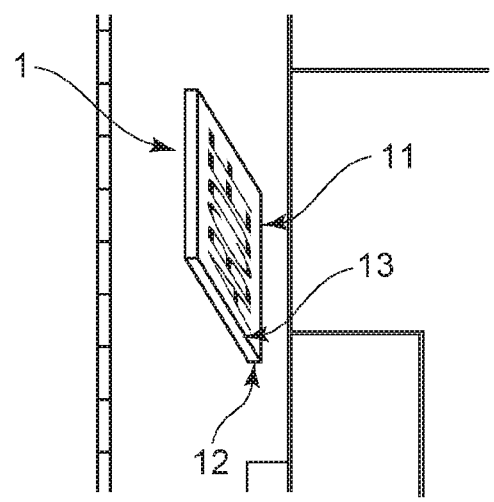
Figure 1C:

First, a stereoscopic illusion image according to this embodiment will be described with reference to FIGS. 1A to 1C. A stereoscopic illusion image is a specific object of a substantially flat shape which is viewed as a 3D image in a predetermined direction. FIG. 1A is a diagram illustrating a soccer field where a sheet 1 including a stereoscopic illusion image printed thereon is placed. The soccer field is viewed from a specific viewpoint where the stereoscopic illusion image is viewed as a 3D image. FIG. 1B is a diagram illustrating the sheet 1 viewed from above. FIG. 1C is a diagram illustrating an example of content displayed in the stereoscopic illusion image.

Examples of a situation in which a stereoscopic illusion image is used include a televised game of soccer. In this case, content of the stereoscopic illusion image is an advertisement of a sponsor, for example. The stereoscopic illusion image is formed on a substantially flat sheet or the like and placed on the ground near a soccer goal post. Such a sheet is less likely to disturb players when compared with a 3D sign board, and therefore, the sheet may be placed near a game area. Accordingly, the stereoscopic illusion image is frequently displayed in a screen of television broadcast and has a high advertisement effect. The stereoscopic illusion image is viewed as a 3D image only when the image is viewed in a specific direction, and therefore, the sheet is installed such that the image is viewed as a 3D object when viewed from a position of a main camera of the television broadcast. By this, the stereoscopic illusion image is viewed by viewers of the television broadcast as if a 3D signboard of an advertisement is installed near a game area. Note that the specific viewpoint where the stereoscopic illusion image is viewed as a 3D object is referred to as a stereoscopic illusion viewpoint in this embodiment.

Although the stereoscopic illusion image is viewed from the stereoscopic illusion viewpoint as if a stereoscopic signboard stands on the ground, a flat sheet is actually installed. An image printed on the sheet is inclined as illustrated in FIG. 1B. Therefore, when the stereoscopic illusion image is viewed from a viewpoint other than the stereoscopic illusion viewpoint, the stereoscopic illusion image is not viewed as a 3D object and content thereof is difficult to be recognized. Although a viewpoint is fixed in general television broadcast, the user may specify an arbitrary virtual viewpoint when a virtual viewpoint image is to be generated using images captured in different directions by a plurality of cameras. Therefore, when a virtual viewpoint other than the stereoscopic illusion viewpoint is specified, a stereoscopic illusion image is not displayed in an effective form, and therefore, an uncomfortable feeling is given to viewers who view the virtual viewpoint image. Furthermore, if content of the stereoscopic illusion image is an advertisement, an advertisement effect is lowered.

Accordingly, in this embodiment, a virtual viewpoint image is generated by converting a stereoscopic illusion image formed on a sheet or the like such that content of the stereoscopic illusion image is easily recognized even when a virtual viewpoint other than the stereoscopic illusion viewpoint is specified.

Configuration of Image Processing System

Figure 2:
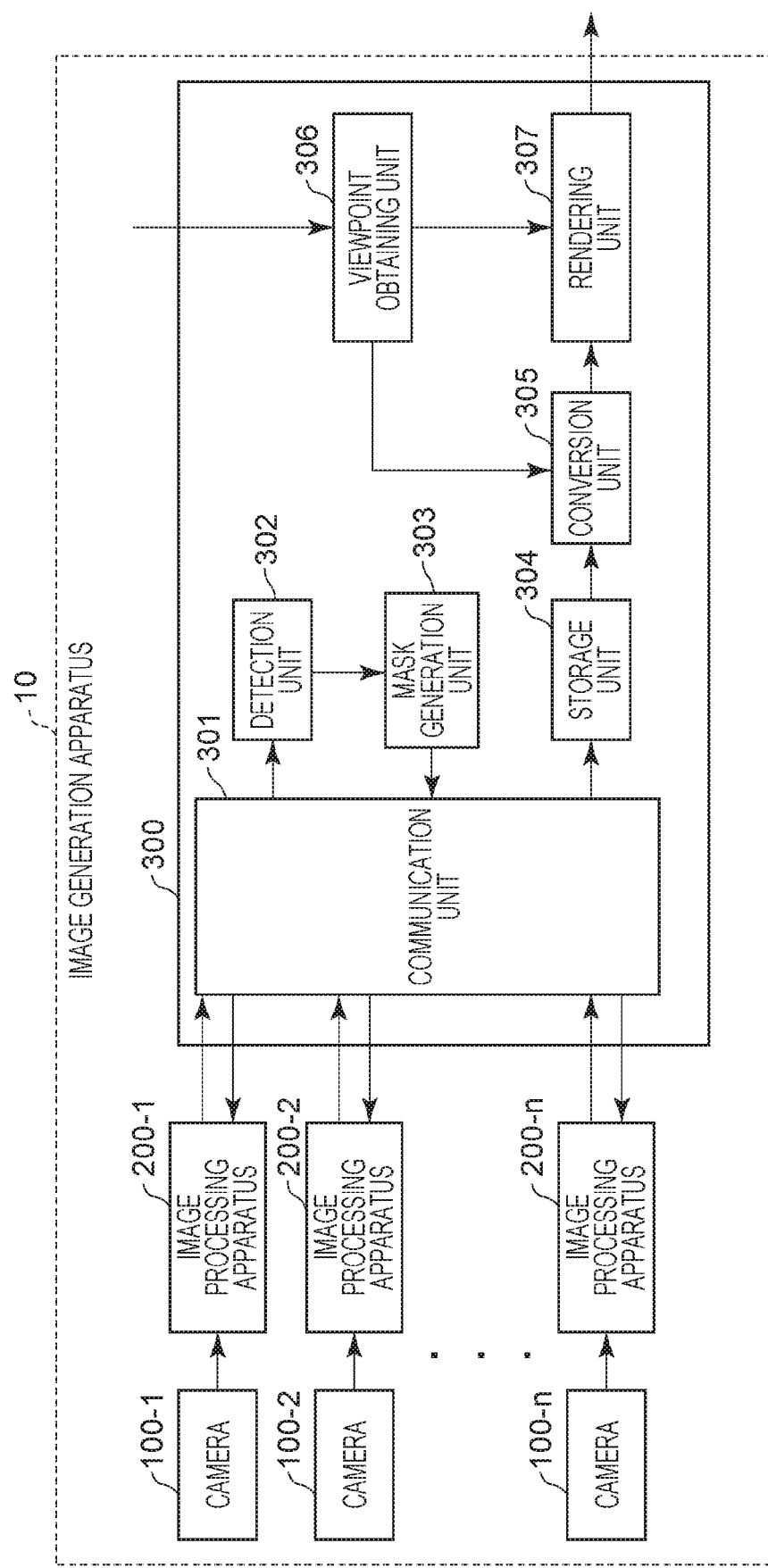
FIG. 2 is a diagram illustrating a functional configuration of an image processing system according to one or more aspects of the present disclosure.

FIG. 2 is a diagram illustrating an entire configuration of an image processing system 10 according to this embodiment. The image processing system 10 generates a virtual viewpoint image representing a view from a specified virtual viewpoint based on images captured by a plurality of cameras 100 and the specified virtual viewpoint. The virtual viewpoint image in this embodiment is also referred to as a free viewpoint video image. However, not only an image corresponding to a viewpoint freely (arbitrarily) specified by the user but also an image corresponding to a viewpoint selected by the user from among a plurality of candidates, for example, are included in the virtual viewpoint image. Furthermore, although a case where a designation of a virtual viewpoint is performed by a user operation is mainly described in this embodiment, the designation of a virtual viewpoint may be automatically performed by the image processing system 10 based on a result of image analysis or the like. Furthermore, although a case where a virtual viewpoint image is a moving image is mainly described in this embodiment, the virtual viewpoint image processed by the image processing system 10 may be a still image.

The image processing system 10 includes n cameras including cameras 100-1 to 100-$n$, $n$ image processing apparatuses including image processing apparatuses 200-1 to 200-$n$, and an image generation apparatus 300. In a case where the cameras and the image processing apparatuses are not distinguished from one to another, the cameras and the image processing apparatuses are simply referred to as a camera 100 and an image processing apparatus 200, respectively, hereinafter. Note that the number of cameras 100 and the number of image processing apparatuses 200 are not limited to those in this embodiment. Furthermore, a plurality of cameras 100 may be connected to a single image processing apparatus 200.

The camera 100 is an imaging apparatus (image capturing apparatus), such as a digital video camera, and has an interface for outputting a video image, such as a serial digital interface (SDI). The different cameras 100 obtain different viewpoint images by capturing images of an imaging target region (image capturing region) in different directions. The imaging target region is a portion of a field or an entire field in this embodiment. The imaging target region includes predetermined objects (foreground objects), such as players and a ball, and a sheet including a stereoscopic illusion image formed thereon for displaying an advertisement. The plurality of cameras 100 installed to surround the imaging target region perform synchronized imaging. Note that the imaging target is not limited to sports games and may be a stage for a singer, a player, or an actor, for example. Furthermore, content displayed by the stereoscopic illusion image is not limited to an advertisement. A captured image obtained by the camera 100 is output to the image processing apparatus 200 connected to the camera 100.

The image processing apparatus 200 includes the SDI for receiving a video signal supplied from the camera 100, for example, and performs image processing on the image captured by the camera 100. Specifically, the image processing apparatus 200 performs a process of separating the region including a predetermined object (a foreground) from a remaining region (a background) in the captured image, a process of further separating a region of the stereoscopic illusion image from an image of the background, and the like. These processes will be described in detail hereinafter. An image processed by the image processing apparatus 200 is output to the image generation apparatus 300.

The image generation apparatus 300 includes a communication unit 301, a detection unit 302, a mask generation unit 303, a storage unit 304, a conversion unit 305, a viewpoint obtaining unit 306, and a rendering unit 307. The communication unit 301 has a LAN card including a high-speed serial interface, such as PCI Express, and performs transmission and reception of information with the image processing apparatus 200. The detection unit 302 performs a process of detecting a stereoscopic illusion image on the image obtained from the image processing apparatus 200 through the communication unit 301. The mask generation unit 303 generates a mask indicating a region of the stereoscopic illusion image detected by the detection unit 302 and supplies the mask to the image processing apparatus 200 through the communication unit 301. The storage unit 304 stores images obtained from the image processing apparatus 200 through the communication unit 301, such as an image of the foreground, an image of the background, and the stereoscopic illusion image. The conversion unit 305 converts the stereoscopic illusion image stored in the storage unit 304.

The viewpoint obtaining unit 306 accepts an operation of specifying a virtual viewpoint performed by the user and obtains viewpoint information indicating a position and a direction of the virtual viewpoint based on the received operation. Note that the viewpoint information may include information on an angle of view and a focus position of the virtual viewpoint. Furthermore, the viewpoint obtaining unit 306 may receive viewpoint information generated by an external apparatus instead of the viewpoint information based on the user operation directly performed. The rendering unit 307 generates a virtual viewpoint image based on the foreground image and the background image which are stored in the storage unit 304, the stereoscopic illusion image converted by the conversion unit 305, and the viewpoint information obtained by the viewpoint obtaining unit 306. Examples of a method for generating a virtual viewpoint image include a method for mapping a texture image corresponding to the viewpoint information to a 3D model of an object of the foreground generated from the foreground image and a 3D model of the background which is obtained in advance and performing rendering. Note that the method for generating a virtual viewpoint image is not limited to this. The generated virtual viewpoint image corresponds to the specified virtual viewpoint and is output to a display apparatus or a storage apparatus (not illustrated) which are outside the image generation apparatus 300.

Note that the configuration of the image processing system 10 is not limited to that illustrated in FIG. 2. For example, the functions of the image processing apparatus 200 may be implemented in the image generation apparatus 300. Alternatively, the communication unit 301, the detection unit 302, the mask generation unit 303, and the storage unit 304 may be implemented in an apparatus which is different from the image generation apparatus 300. In this case, the image generation apparatus 300 generates a virtual viewpoint image using the foreground image and the background image which are supplied from the different apparatus.

Figure 3:
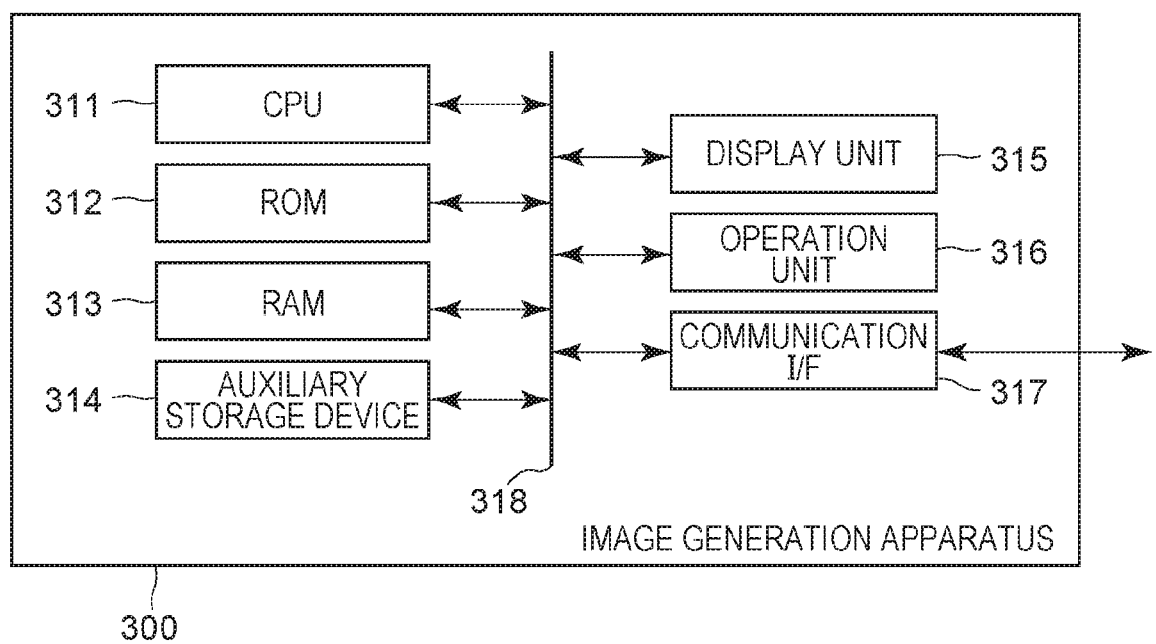
FIG. 3 is a diagram illustrating a hardware configuration of an image generation apparatus according to one or more aspects of the present disclosure.

Next, a hardware configuration of the image generation apparatus 300 will be described with reference to FIG. 3. The image generation apparatus 300 includes a central processing unit (CPU) 311, a read only memory (ROM) 312, a random access memory (RAM) 313, an auxiliary storage device 314, a display unit 315, an operation unit 316, a communication I/F 317, and a bus 318.

The CPU 311 controls the entire image generation apparatus 300 using computer programs and data stored in the ROM 312 and the RAM 313. Note that the image generation apparatus 300 may include at least one dedicated hardware section which is different from the CPU 311, and at least a portion of the process of the CPU 311 may be executed by the dedicated hardware. Examples of the dedicated hardware include an application specific integrated circuit (ASIC), a field programmable gate array (FPGA), and a digital signal processor (DSP). The ROM 312 stores programs and parameters which are not required to be changed. The RAM 313 temporarily stores programs and data supplied from the auxiliary storage device 314 and data externally supplied from the communication I/F 317. The auxiliary storage device 314 is constituted by a hard disk drive, for example, and stores various data including image data and audio data.

The display unit 315 is constituted by a liquid crystal display, a light emitting diode (LED), or the like, for example, and displays a graphical user interface (GUI) used by the user to operate the image generation apparatus 300. The operation unit 316 is constituted by a keyboard, a mouse, a touch panel, and the like, for example, and inputs various instructions to the CPU 311 in response to operations performed by the user. The communication I/F 317 is used to communication with an external apparatus, such as the image processing apparatus 200. For example, when the image generation apparatus 300 is connected to an external apparatus in a wired manner, a communication cable is connected to the communication I/F 317. Note that, when the image generation apparatus 300 has a function of wireless communication with an external apparatus, the communication I/F 317 includes an antenna. The bus 318 is used for connection among the units of the image generation apparatus 300 so as to transmit information.

Although the display unit 315 and the operation unit 316 are incorporated in the image generation apparatus 300 in this embodiment, the image generation apparatus 300 may not include at least one of the display unit 315 and the operation unit 316. Furthermore, at least one of the display unit 315 and the operation unit 316 may be installed outside the image generation apparatus 300 and the CPU 311 may operate as a display controller which controls the display unit 315 and an operation controller which controls the operation unit 316.

Operation Flow of Image Processing System

Figure 4:
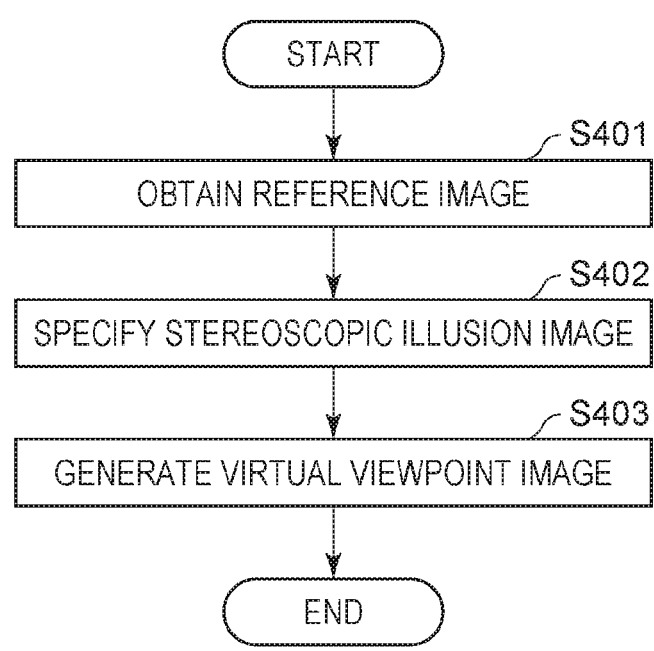
FIG. 4 is a flowchart of an operation performed by the image processing system according to one or more aspects of the present disclosure.

An operation flow of the image processing system 10 will be described with reference to FIG. 4. The process illustrated in FIG. 4 is started when an initial setting of the system is completed before a game of a target of generation of a virtual viewpoint image is started and imaging is performed by the camera 100. The system initial setting includes installation of a plurality of cameras 100 which are directed to an imaging target region, connection between the image processing apparatus 200 and the image generation apparatus 300 through a cable or the like, synchronization of the plurality of cameras 100, and calibration. Note that the timing when the process in FIG. 4 is started is not limited to this. The process in FIG. 4 may be performed during imaging of the cameras 100 or at an arbitrary timing after the imaging using data stored based on the imaging performed by the cameras 100.

Figure 5:
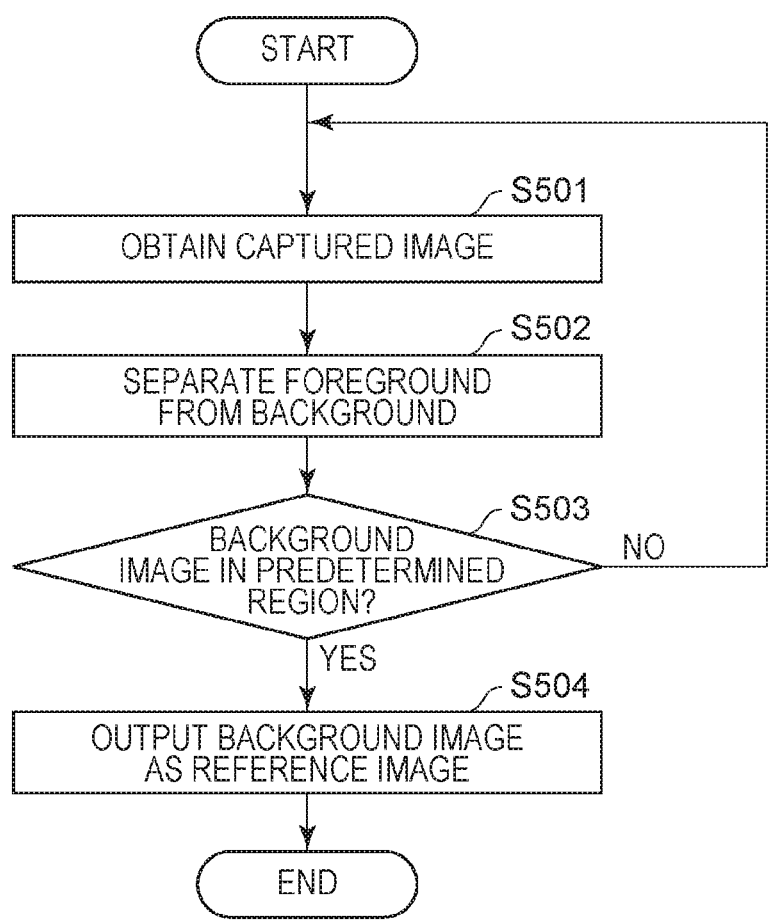
FIG. 5 is a flowchart of a process of obtaining a reference image according to one or more aspects of the present disclosure.

The process in FIG. 4 is realized when the CPU 311 develops a program stored in the ROM 312 in the RAM 313 and executes the program. Note that at least a portion of the process in FIG. 4 may be realized by at least one dedicated hardware device which is different from the CPU 311. The same is true of processes of flowcharts in FIGS. 5, 6, and 9 described below.

First, in step S401, the image processing system 10 obtains a reference image based on an image captured before a sheet including a stereoscopic illusion image printed thereon is installed in the imaging target region. In step S402, the image processing system 10 specifies a stereoscopic illusion image positioned in the imaging target region based on an image captured after the sheet is installed in the imaging target region. In step S403, a virtual viewpoint image is generated based on the image including the captured imaging target region where a game is played. Here, the virtual viewpoint image generated here is subjected to conversion so that a stereoscopic illusion image is effectively displayed. When an instruction for stopping generation of a virtual viewpoint image is issued, the process in FIG. 4 is terminated.

Process of Obtaining Reference Image

Next, processes in the processing flow of FIG. 4 will be described in detail. A process in FIG. 5 corresponds to the process of obtaining a reference image performed in step S401 and is executed by the image processing apparatus 200 based on the captured image before the sheet including the stereoscopic illusion image printed thereon is installed in the imaging target region. When the virtual viewpoint image is generated by converting the stereoscopic illusion image in the process in step S403 below, an image of the ground which is hidden by the sheet including the stereoscopic illusion image printed thereon is interpolated. Therefore, in the process in FIG. 5, the image processing apparatus 200 obtains a reference image used by the image processing apparatus 200 to perform interpolation.

In step S501, the image processing apparatus 200 obtains a captured image for one frame from the camera 100. In step S502, the image processing apparatus 200 separates a foreground image and a background image from each other in the captured image. The foreground is a predetermined object region, such as a player or a ball, and the background is a region corresponding to a field or stands. Examples of a method for separating the foreground and the background from each other include a method for extracting a difference region obtained by comparing the captured image and an image obtained in advance with each other as the foreground and a method for extracting a region which changes with time as a foreground. A method to be used is not limited.

In step S503, the image processing apparatus 200 determines whether an image of the predetermined region included in imaging target region is included in the separated background image. Examples of the predetermined region include a region in which the sheet including the stereoscopic illusion image printed thereon is to be installed and a region in which it is highly likely that the sheet is installed, such as a region near a game area. Note that the predetermined region may be specified by a user operation. Furthermore, all imaging ranges of the cameras 100 may be determined as the predetermined region. In this case, in step S503, it is determined whether a captured image which does not include a foreground has been obtained.

When it is determined that the background image does not include the image of the predetermined region in step S503, an appropriate reference image may not be obtained for the interpolation, and therefore, the image processing apparatus 200 returns to step S501 where a captured image of a next frame is obtained. On the other hand, when it is determined that the background image includes the image of the predetermined region in step S503, the image processing apparatus 200 proceeds to step S504 where the background image is output to the image generation apparatus 300 as a reference image and terminates the process in FIG. 5. The reference image input to the image generation apparatus 300 is stored in the storage unit 304. Note that the image processing system 10 may interpolate an image of the ground hidden by the sheet with an image of the ground near the image of the ground hidden by the sheet or the like in the generation of the virtual viewpoint image in step S403. In this case, the process in FIG. 5, that is, obtainment of a reference image in step S401 may not be performed.

Process of Specifying Stereoscopic Illusion Image

Figure 6:
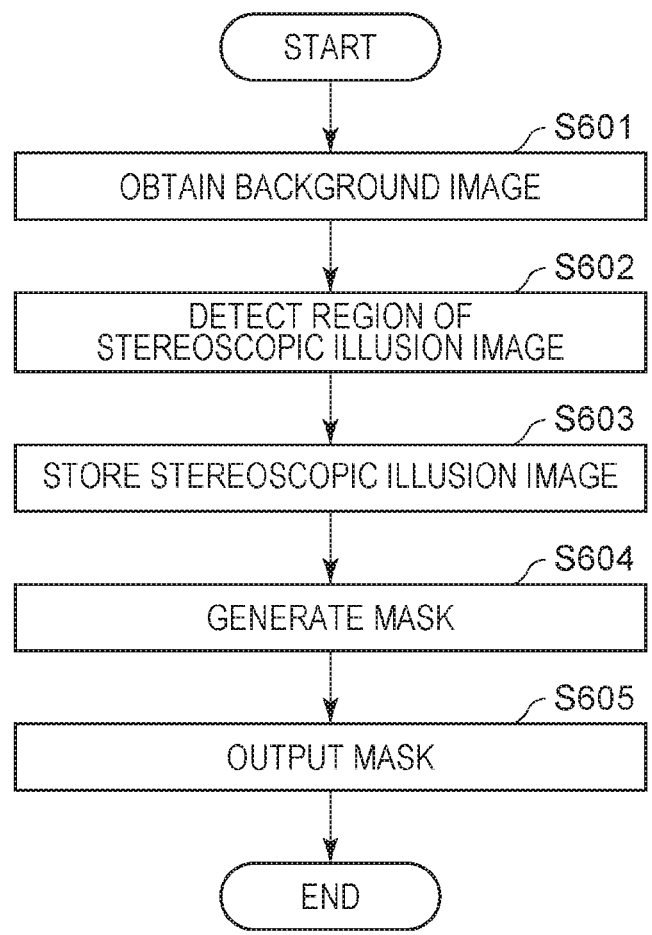
FIG. 6 is a flowchart of a process of specifying a stereoscopic illusion image according to one or more aspects of the present disclosure.

A process in FIG. 6 corresponds to the process of specifying a stereoscopic illusion image performed in step S402 and is executed by the image generation apparatus 300 based on images captured by the cameras 100 after the sheet including the stereoscopic illusion image printed thereon is installed in the imaging target region. When n cameras 100 are used, the process in FIG. 6 is executed at least once on each of the n cameras. In the succeeding process in step S403, to generate a virtual viewpoint image by converting a stereoscopic illusion image, a converted stereoscopic illusion image and a background image from which the stereoscopic illusion image is removed are used. Therefore, in the process in FIG. 6, the image generation apparatus 300 generates a mask for specifying a region (identifying a shape) of the stereoscopic illusion image in the captured image.

In step S601, the detection unit 302 obtains a background image from the image processing apparatus 200 through the communication unit 301. In step S602, the detection unit 302 detects a stereoscopic illusion image included in the obtained background image and specifies a region corresponding to the stereoscopic illusion image. A method for the specifying is not limited, and the detection unit 302 may externally obtain and store data indicating contents and features of the stereoscopic illusion image in advance and specify a region of the stereoscopic illusion image based on a result of image analysis performed on the background image using the data. Furthermore, the detection unit 302 may specify a region of the stereoscopic illusion image by comparing the reference image described above based on imaging performed in a state in which the stereoscopic illusion image is not included in the imaging target region with the background image based on the imaging in a state in which the stereoscopic illusion image is included in the imaging target region. Furthermore, the image generation apparatus 300 may cause the display unit to display the obtained background image and may specify the region based on a user operation of specifying a region of the stereoscopic illusion image in the displayed image, for example.

Figure 7:
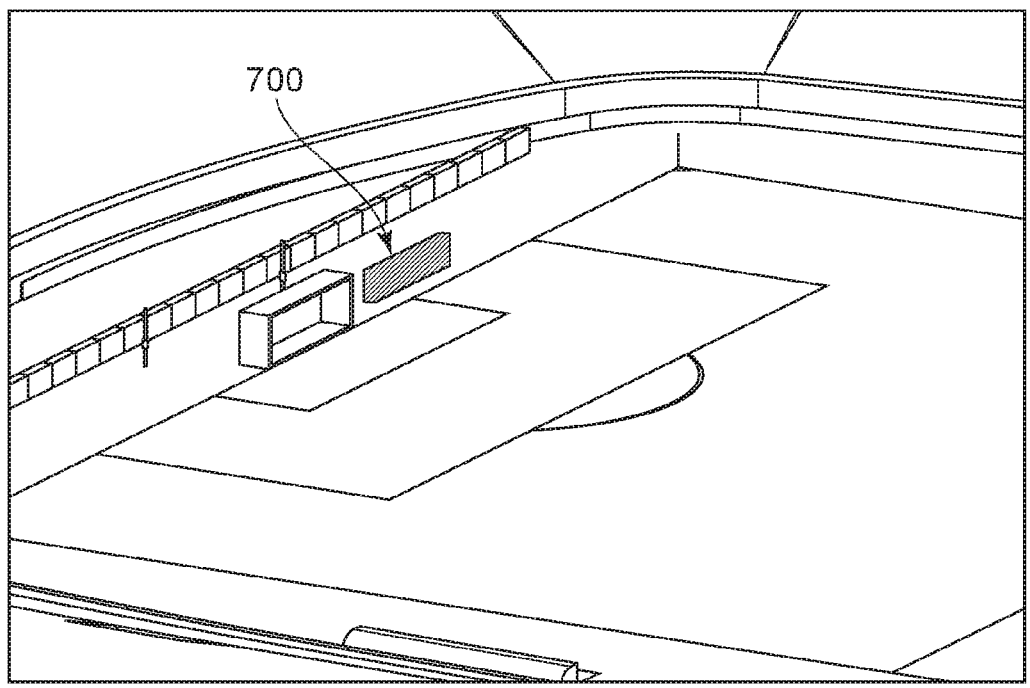
FIG. 7 is a diagram illustrating detection of a region of the stereoscopic illusion image according to one or more aspects of the present disclosure.

Note that the image generation apparatus 300 may obtain an image captured by the camera 100 from the image processing apparatus 200 in step S601 and detect a stereoscopic illusion image included in the obtained captured image. Note that, since the detection process is performed on the background image obtained by removing a predetermined moving object, such as a player, from the captured image, a region of the stereoscopic illusion image may be more easily specified. FIG. 7 is a diagram illustrating an example of a region 700 of a stereoscopic illusion image included in a captured image of a certain camera 100. In step S603, the detection unit 302 stores the stereoscopic illusion image included in a specified region in the storage unit 304.

Figure 8:
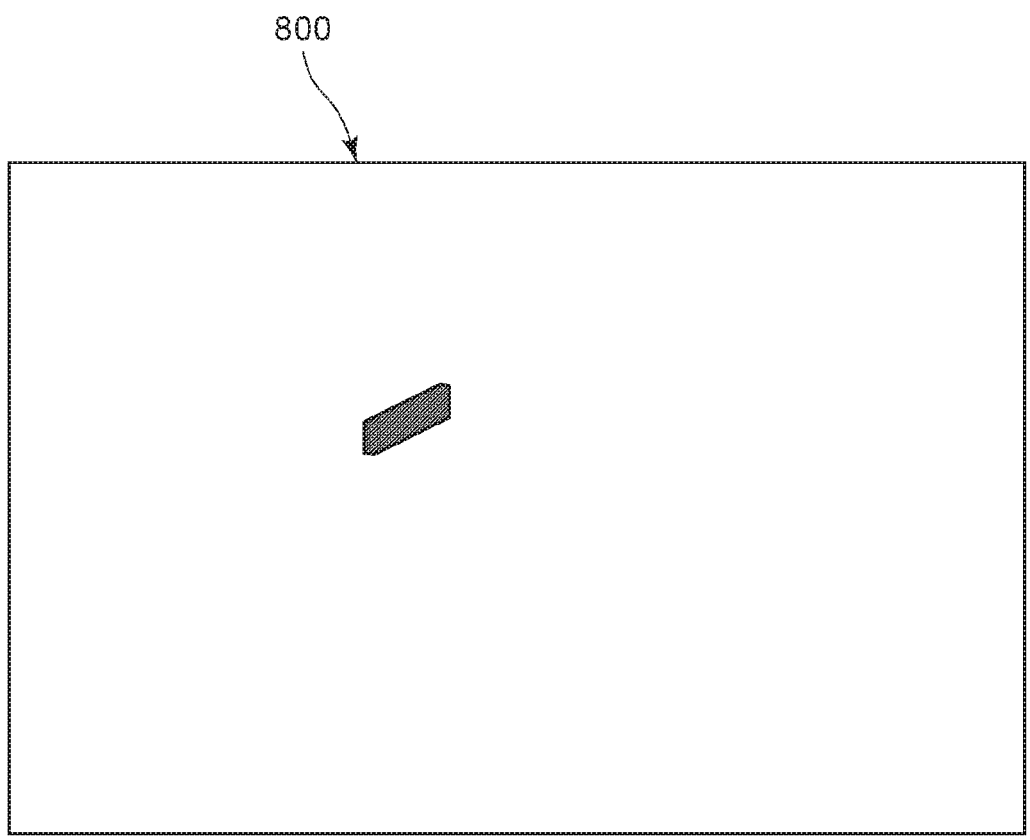
FIG. 8 is a diagram illustrating generation of a mask according to one or more aspects of the present disclosure.

In step S604, the mask generation unit 303 generates a mask indicating the specified region in images captured by the individual cameras 100 based on a result of the specifying of the region of the stereoscopic illusion image performed by the detection unit 302. For example, the mask generated by the mask generation unit 303 may be a binary mask image having pixel values in the region of the stereoscopic illusion image of $(R, G, B)=(0, 0, 0)$ and pixel values in the other region of $(R, G, B)=(1, 1, 1)$. Furthermore, the mask generation unit 303 may generate information indicating a coordinate value of the region of the stereoscopic illusion image, for example. FIG. 8 is a diagram illustrating an example of a mask image 800 indicating the region 700 of the stereoscopic illusion image of FIG. 7. In step S605, the mask generation unit 303 outputs the generated mask to the image processing apparatus 200 through the communication unit 301 and the process in FIG. 6 is terminated.

The image processing apparatus 200 may obtain a background image from which the region of the stereoscopic illusion image is removed using the mask generated by the mask generation unit 303. For example, the image processing apparatus 200 multiplies a pixel value of the background image separated from the capture image by a pixel value of the mask image for each pixel. The pixel value of the region of the stereoscopic illusion image in the mask image is (R, G, B)=(0, 0, 0), and therefore, a pixel value in the region of the stereoscopic illusion image in the multiplied image is also (R, G, B)=(0, 0, 0). On the other hand, a pixel value in the other region in the mask image is (R, G, B)=(1, 1, 1), and therefore, the pixel value of the background image remains in the multiplied image. Consequently, an image obtained by removing the region of the stereoscopic illusion image from the background image is generated. Furthermore, if the same process is performed while a pixel value of the mask image is inverted (0 and 1 of a pixel value for each pixel is exchanged), only the stereoscopic illusion image may be extracted from the background image. Note that the process of removing the region of the stereoscopic illusion image from the background image may be performed by the image generation apparatus 300. In this case, the same process described above is executed by the image generation apparatus 300, and therefore, a mask may not be output to the image processing apparatus 200.

Figure 9:
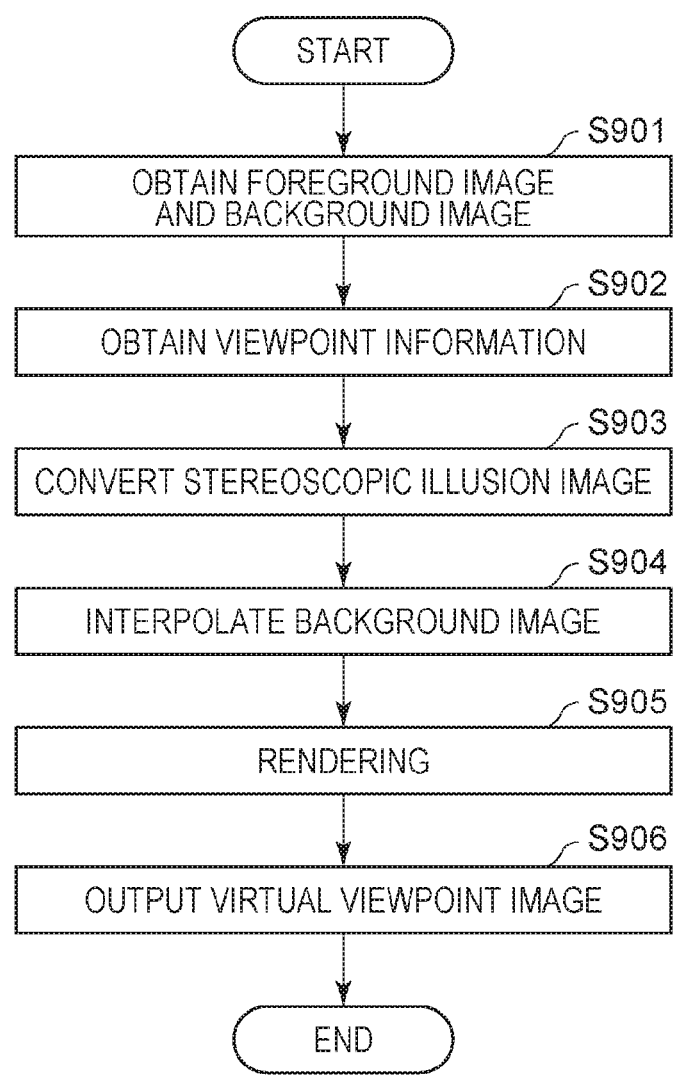
FIG. 9 is a flowchart of a process of generating a virtual viewpoint image according to one or more aspects of the present disclosure.

Process of Generating Virtual Viewpoint Image Including Deformed Stereoscopic Illusion Image A process in FIG. 9 is associated with the generation of a virtual viewpoint image in step S403, and is executed by the image generation apparatus 300 based on an image obtained by capturing the imaging target region in which the game of the target of the generation of a virtual viewpoint image is played. In a case where the generated virtual viewpoint image is a moving image, the process in FIG. 9 is executed for each frame of the moving image. In the process in FIG. 9, a shape of the stereoscopic illusion image in a 3D space is deformed depending on a position of a specified virtual viewpoint such that the stereoscopic illusion image is efficiently displayed when viewed from the virtual viewpoint.

In step S901, the storage unit 304 obtains images supplied from the plurality of image processing apparatuses 200 through the communication unit 301. The obtained images correspond to image data based on imaging in the plurality of directions performed by the plurality of cameras 100 which capture the imaging target region, and specifically, the images include the foreground image and the background image obtained after the region of the stereoscopic illusion image is removed by the process using the mask described above. Note that the storage unit 304 may obtain the images captured by the plurality of cameras 100 as image data based on the imaging and generate a foreground image and a background image to be stored using the captured images. Alternatively, the storage unit 304 may obtain, instead of or in addition to a foreground image and a background image, 3D shape data generated by another apparatus based on a captured image and texture data thereof as image data based on the imaging.

In this embodiment, the 3D shape data indicates a 3D shape of an object, and is represented by a group of points having positional information represented by xyz coordinates in a 3D space corresponding to an imaging target region, for example. Furthermore, the 3D shape data is not limited to that represented by a point group and may be represented by other data forms, such as a polygon mesh constituted by polygons, such as triangles or squares, or a voxel.

In step S902, the viewpoint obtaining unit 306 obtains viewpoint information indicating a position and a direction of a virtual viewpoint. In step S903, the conversion unit 305 converts the stereoscopic illusion image stored in the storage unit 304 in step S603. Note that the stereoscopic illusion image which is to be converted and which has been stored in the storage unit 304 may be appropriately updated based on an image input to the image generation apparatus 300 from the image processing apparatus 200.

Here, an example of the process of converting the stereoscopic illusion image will be described in detail. In this embodiment, the conversion unit 305 generates a 3D model (3D shape data) corresponding to the stereoscopic illusion image stored in the storage unit 304. Hereinafter, the 3D model is described as a stereoscopic illusion model. As a principle in which the stereoscopic illusion image is viewed as a 3D object when viewed from a stereoscopic illusion viewpoint, a characteristic of a human brain in which when a human brain interprets an image, sides (sides 11 to 13 and the like in FIG. 1B) and planes which are orthogonal to each other are preferentially recognized is utilized. Therefore, the conversion unit 305 may generate a stereoscopic illusion model which matches a 3D shape recognized when viewed from the stereoscopic illusion viewpoint by performing calculation using the sides of the stereoscopic illusion image as a characteristic. Furthermore, the storage unit 304 stores parameters associated with the positions and the directions of the cameras 100 obtained by the camera calibration at the time of the system initial setting. Then the conversion unit 305 may fit a position and a size of the stereoscopic illusion model to those of the actual stereoscopic illusion image using the parameters and a result of specifying of the region of the stereoscopic illusion image obtained by the detection unit 302. Note that, if design information of the stereoscopic illusion image may be obtained, the conversion unit 305 may generate a stereoscopic illusion model using the information.

The conversion unit 305 further generates an image (texture) to be displayed on the stereoscopic illusion model using the stereoscopic illusion image stored in the storage unit 304 and attaches the generated image to the stereoscopic illusion model. The stereoscopic illusion image is basically not moved in a game unlike the foreground, and therefore, the same texture may be continuously used based on the stereoscopic illusion image obtained in step S603. However, a direction of light and the like in the imaging target region may be changed, and therefore, the texture of the stereoscopic illusion model may be updated using a stereoscopic illusion image extracted from images captured during the game. Furthermore, if information indicating content of the stereoscopic illusion image may be obtained, the conversion unit 305 may generate texture using the information.

Figure 10A:
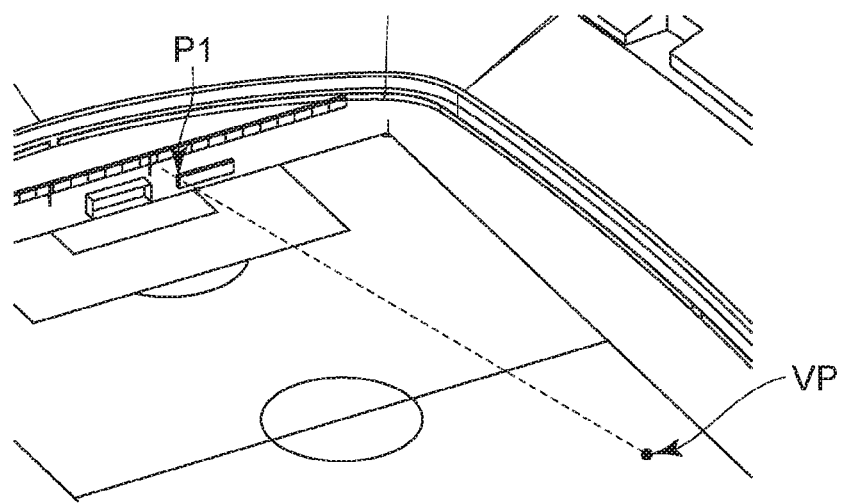
FIGS. 10A to 10C are diagrams illustrating conversion of the stereoscopic illusion image according to one or more aspects of the present disclosure.
Figure 10B:
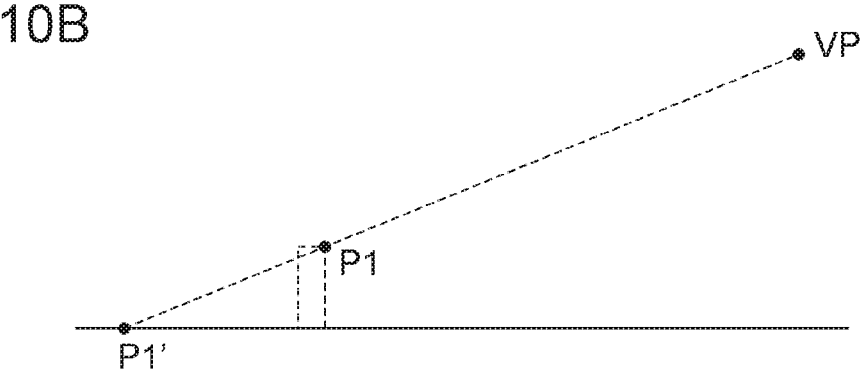
Figure 10C:
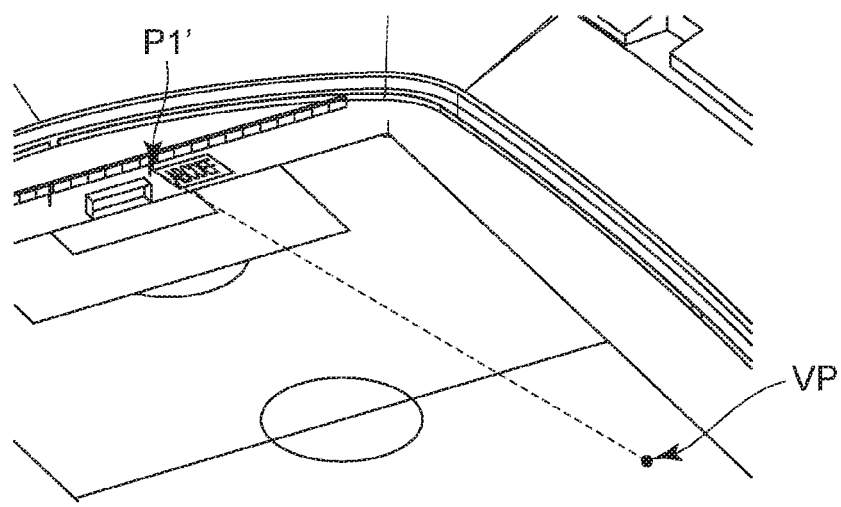

When the stereoscopic illusion model and the texture thereof are generated, the conversion unit 305 converts the stereoscopic illusion model into a substantially flat deformed stereoscopic illusion image based on a position of a virtual viewpoint indicated by the viewpoint information obtained by the viewpoint obtaining unit 306. FIG. 10A is a plane view in a case where the stereoscopic illusion model is installed in the 3D space corresponding to the imaging target region. In FIG. 10A, VP indicates the position of the virtual viewpoint. FIG. 10B is a diagram illustrating a case where the same state is viewed in a horizontal direction. A position where a straight line connecting the position VP of the virtual viewpoint and a vertex P1 which is a feature point of the stereoscopic illusion model intersects with the ground is indicated by P1'. In this way, the conversion unit 305 calculates positions where straight lines which connect various points of the stereoscopic illusion model to the position of the virtual viewpoint intersect with the ground, and converts the stereoscopic illusion model into a substantially flat stereoscopic illusion image using a result of the calculation. FIG. 10C is a plane view in a case where the converted stereoscopic illusion image is disposed in the 3D space. When viewed from the virtual viewpoint VP, the stereoscopic illusion image is viewed as a 3D object similarly to the stereoscopic illusion model of FIG. 10A.

In this way, by deforming the shape of the stereoscopic illusion image in the 3D space to another flat shape, even in a case where a position of a virtual viewpoint is specified in a position different from an original stereoscopic illusion viewpoint, a virtual viewpoint image including the stereoscopic illusion image viewed as a 3D object may be generated. Note that the method for converting the stereoscopic illusion image is not limited to that described above. For example, the conversion unit 305 determines a shape in the 3D space of the stereoscopic illusion image installed in the imaging target region based on the parameters associated with the positions and the directions of the cameras 100 and results of specifying of the regions of the stereoscopic illusion images for the individual cameras 100 performed by the detection unit 302. Then the conversion unit 305 may directly deform a determined shape of the stereoscopic illusion image in the 3D space into another substantially flat shape corresponding to a position of a virtual viewpoint indicated by viewpoint information. If the virtual viewpoint image is generated in this way using a result of the deformation of the stereoscopic illusion image, generation of a stereoscopic illusion model is not required, and therefore, a processing amount of the image generation apparatus 300 may be reduced.

Note that the image processing system 10 may deform the shape of the stereoscopic illusion image in the 3D space into a stereoscopic shape and generate a virtual viewpoint image using 3D shape data of the deformed stereoscopic illusion image. Specifically, the rendering unit 307 arranges a 3D model of the background obtained in advance, a 3D model of the foreground generated based on a foreground image, and a stereoscopic illusion model represented by the 3D shape data generated by the conversion unit 305 in the 3D space. Then the rendering unit 307 attaches the texture to the 3D model of the foreground and the 3D model of the background using the foreground image and the background image. Furthermore, the rendering unit 307 attaches the texture generated by the conversion unit 305 to the stereoscopic illusion model. Then the rendering unit 307 performs rendering based on the viewpoint information so as to generate a virtual viewpoint image. The virtual viewpoint image generated in this way is based on the virtual viewpoint indicated by the viewpoint information, and a substantially flat stereoscopic illusion image positioned in the imaging target region is replaced by a stereoscopic virtual object represented by the stereoscopic illusion model. In a case where the image generation apparatus 300 has stored design information and texture information of the stereoscopic illusion model in advance or a case where the image generation apparatus 300 may externally obtain the information, the conversion unit 305 may obtain the information to be output to the rendering unit 307. Here, the design information of the stereoscopic illusion model corresponds to appearance information, such as a width, a depth, and a height of a virtual object represented by the stereoscopic illusion image and information on a position of the object. Furthermore, the conversion unit 305 may attach texture to the stereoscopic illusion model before outputting the model to the rendering unit 307.

Referring back to FIG. 9, in step S904, the conversion unit 305 interpolates a portion in which the region of the stereoscopic illusion image is removed in the background image obtained in step S901 with the reference image obtained in step S401. By this, in a case where a shape of the stereoscopic illusion image in the 3D space is deformed, generation of a region in which color information is lacked in the background may be suppressed. In step S905, the rendering unit 307 generates a virtual viewpoint image based on the foreground image supplied from the storage unit 304, the background image interpolated by the conversion unit 305, the stereoscopic illusion image deformed by the conversion unit 305, and the viewpoint information obtained by the viewpoint obtaining unit 306. The virtual viewpoint image generated as described above corresponds to the virtual viewpoint indicated by the viewpoint information and includes the stereoscopic illusion image obtained by deforming the shape thereof in the 3D space in accordance with a position of the virtual viewpoint. In step S907, the rendering unit 307 outputs the generated virtual viewpoint image to an external display apparatus and an external storage apparatus in a predetermined image format. The process in FIG. 9 is thus terminated.

Example of Generated Virtual Viewpoint Image

Figure 11A:
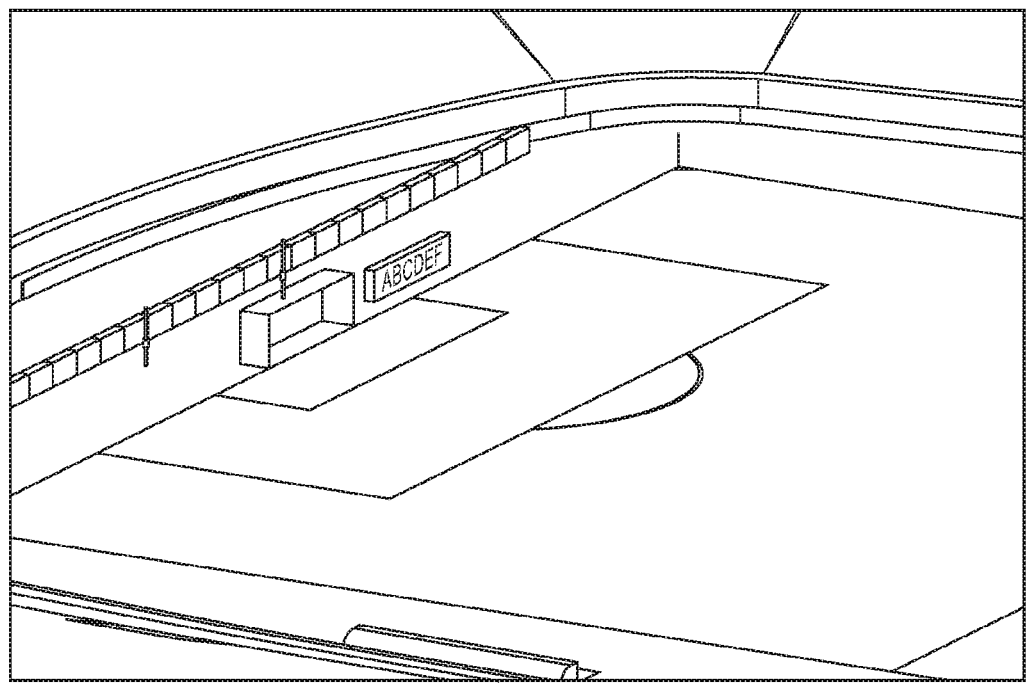
FIGS. 11A to 11D are diagrams illustrating a virtual viewpoint image generated by a configuration of an embodiment according to one or more aspects of the present disclosure.
Figure 11B:
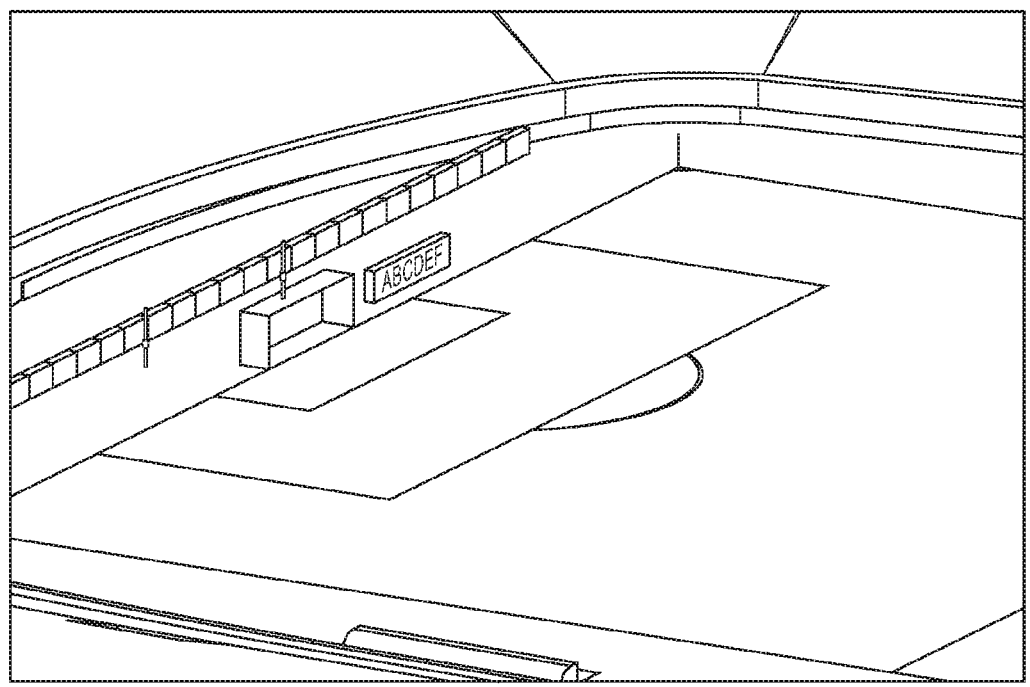

A difference between a virtual viewpoint image generated through the process described above performed by the image processing system 10 according to this embodiment and a virtual viewpoint image generated in a general method is described with reference to FIGS. 11A to 11D. FIG. 11A is a diagram illustrating an example of a virtual viewpoint image generated in a general method by specifying a virtual viewpoint in a position which coincides with a stereoscopic illusion viewpoint. FIG. 11B is a diagram illustrating an example of a virtual viewpoint image generated in the method of this embodiment by specifying a virtual viewpoint in a position which coincides with a stereoscopic illusion viewpoint. In these cases, since the virtual viewpoint and the stereoscopic illusion viewpoint match each other, the stereoscopic illusion image is displayed to be viewed as a 3D object even when any of the methods is employed. Note that, when a camera 100 is installed in a direction of the stereoscopic illusion viewpoint, an image captured by the camera 100 is also similar to the images in FIGS. 11A and 11B. Specifically, the stereoscopic illusion image in the virtual viewpoint image which corresponds to the virtual viewpoint positioned in the direction of the stereoscopic illusion viewpoint substantially matches the stereoscopic illusion image in the image captured by the camera 100 positioned in the direction of the stereoscopic illusion viewpoint.

Figure 11C:
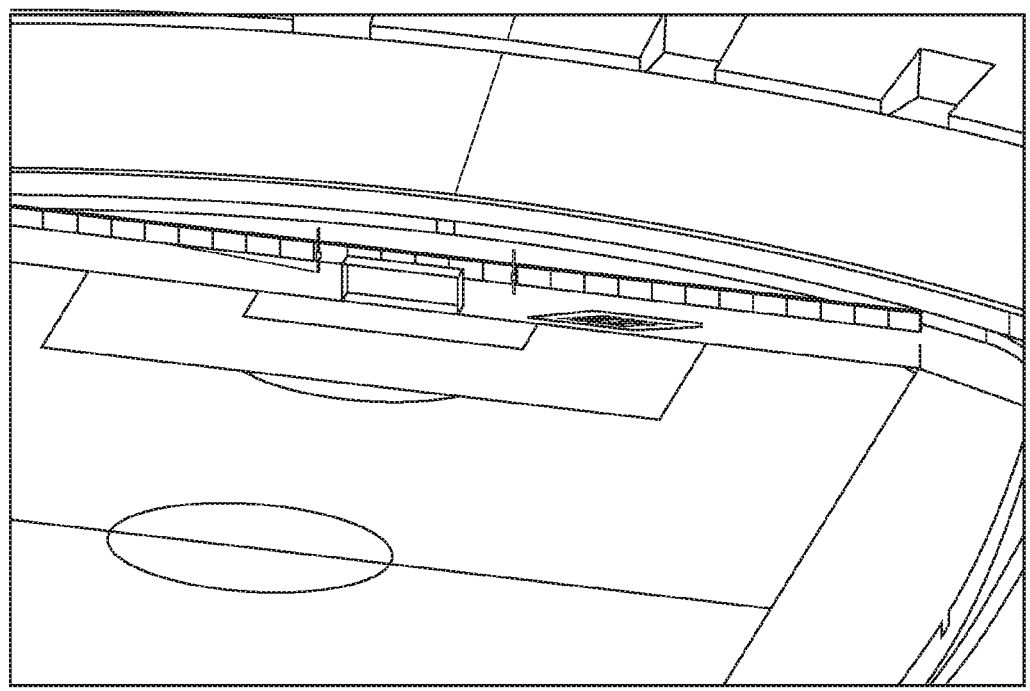
Figure 11D:
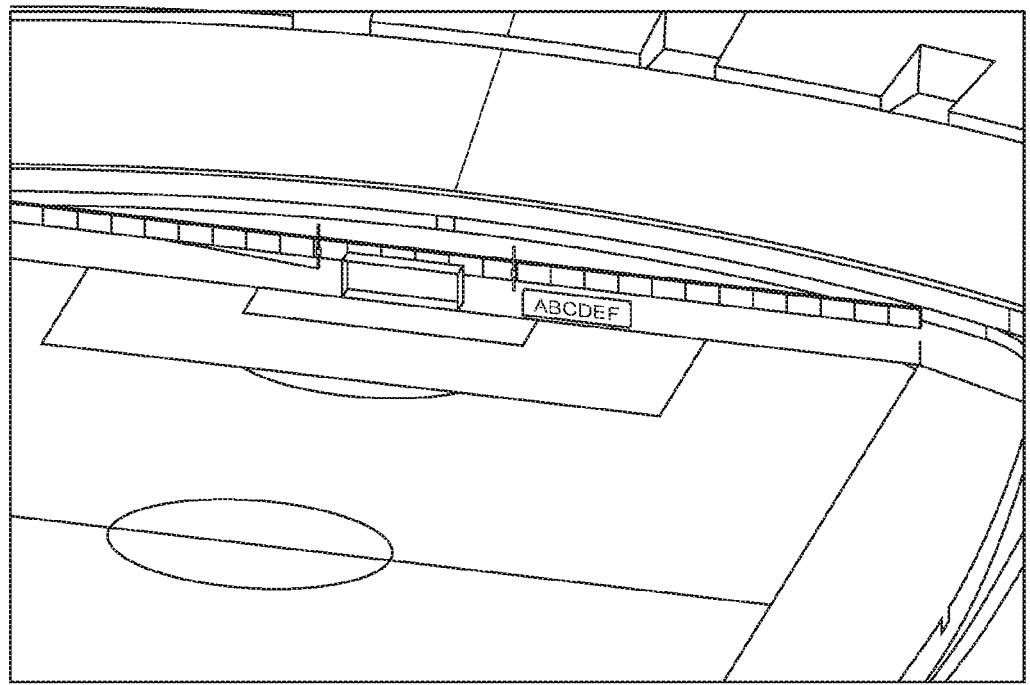

On the other hand, FIG. 11C is a diagram illustrating an example of a virtual viewpoint image generated in the general method by specifying a virtual viewpoint in a position which is different from the stereoscopic illusion viewpoint. FIG. 11D is a diagram illustrating an example of a virtual viewpoint image generated in the method of this embodiment by specifying a virtual viewpoint in a position which is different from the stereoscopic illusion viewpoint. In FIG. 11C, since the virtual viewpoint and the stereoscopic illusion viewpoint do not coincide with each other, and therefore, the stereoscopic illusion image is not viewed as a 3D object and content thereof is difficult to be recognized.

On the other hand, in FIG. 11D, the virtual viewpoint image is generated by deforming a shape of the stereoscopic illusion image in the 3D space such that the stereoscopic illusion image is viewed as a 3D object when viewed in a direction of the virtual viewpoint, and therefore, as with the case of FIG. 11B, the stereoscopic illusion image is viewed as a 3D object. In this way, according to this embodiment, content of the stereoscopic illusion image may be efficiently displayed even when a position of the virtual viewpoint is changed. If content of the stereoscopic illusion image is an advertisement, an advertisement effect may be enhanced.

As described above, the image generation apparatus 300 of this embodiment obtains image data based on imaging in a plurality of directions performed by the plurality of cameras 100 which image an imaging target region and obtain viewpoint information indicating a virtual viewpoint. Then the image generation apparatus 300 generates a virtual viewpoint image corresponding to the virtual viewpoint indicated by viewpoint information based on the obtained image data and the viewpoint information. In this case, the image generation apparatus 300 generates a virtual viewpoint image by deforming a shape of the stereoscopic illusion image in the imaging target region in the 3D space in accordance with a position of the virtual viewpoint. With this configuration, in a virtual viewpoint image generated based on an image obtained by capturing a region including a specific object, such as a stereoscopic illusion image, the specific object may be displayed in a form in which content thereof is easily recognized.

Other Embodiment

Figure 12:
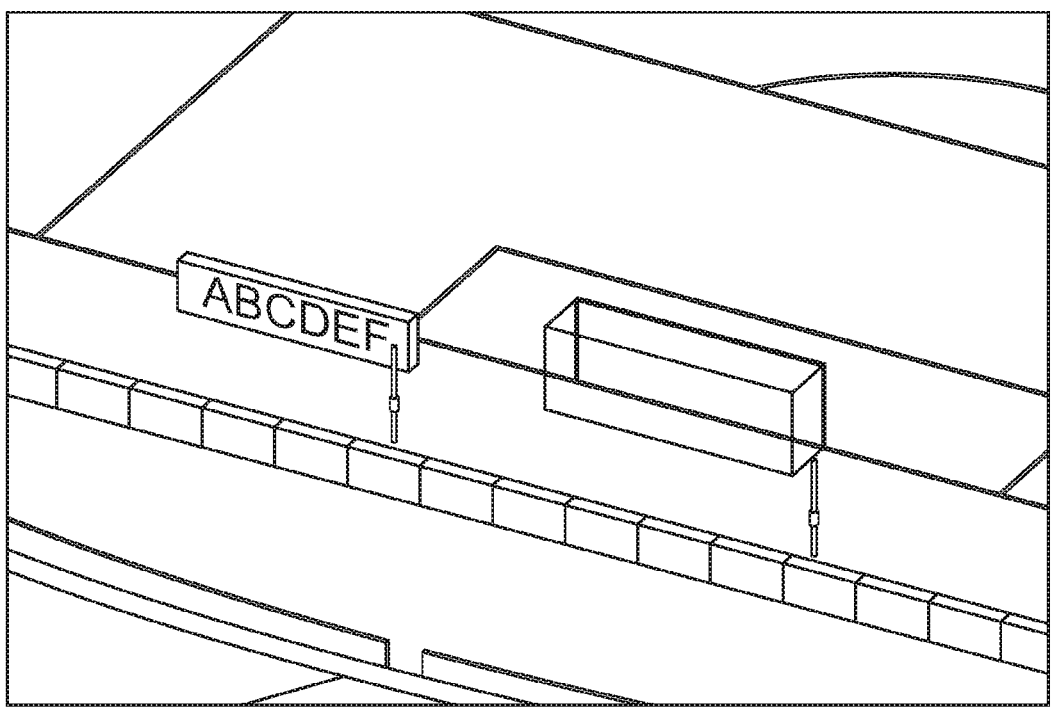
FIG. 12 is a diagram illustrating a virtual viewpoint image generated by the configuration of an embodiment according to one or more aspects of the present disclosure.

Here, a method for more efficiently displaying a stereoscopic illusion image will be described with reference to FIG. 12. The stereoscopic illusion image only includes information on a plane on a stereoscopic illusion viewpoint side of a 3D object seen to be presence when viewed from the stereoscopic illusion viewpoint. Therefore, in a case where a virtual viewpoint is specified in a position opposite to the stereoscopic illusion viewpoint relative to the stereoscopic illusion image, conversion of the stereoscopic illusion image may not be performed or the stereoscopic illusion image may be unnaturally viewed. It is assumed that a sheet including a stereoscopic illusion image which is seen as if a 3D signboard for displaying an advertisement exists printed thereon is installed. Although information on an advertisement display plane viewed from a stereoscopic illusion viewpoint of the signboard is included in the stereoscopic illusion image, information on a plane corresponding to a backside of the signboard is not included in the stereoscopic illusion image.

Accordingly, the image generation apparatus 300 obtains image information corresponding to the plane of the backside, and when a position of a virtual viewpoint indicated by the viewpoint information is on the backside of the signboard, content of a deformed stereoscopic illusion image may be changed to image information corresponding to the plane on the backside. The image information corresponding to the plane on the backside may be externally obtained by the image generation apparatus 300 or generated based on the image information (the stereoscopic illusion image stored in the storage unit 304) corresponding to the plane on the front side. For example, image information "ABCDEF" on the plane on the front side illustrated in FIG. 1 may also be used in the backside as illustrated in FIG. 12. By this process, a range of the virtual viewpoint in which content of the stereoscopic illusion image is efficiently displayed may be enlarged.

Note that, although a virtual viewpoint image which efficiently displays a stereoscopic illusion image is generated by deforming a shape of the stereoscopic illusion image in a 3D space in this embodiment, a method for efficiently displaying the stereoscopic illusion image is not limited to this. For example, the conversion unit 305 may output the stereoscopic illusion model described above to the rendering unit 307 without reconverting the model into a substantially plane stereoscopic illusion image, and the rendering unit 307 may perform rendering using a 3D model of a foreground, a 3D model of a background, and the stereoscopic illusion model. Specifically, the rendering unit 307 may generate a virtual viewpoint image by replacing the stereoscopic illusion image in an imaging target region by the stereoscopic illusion model which is a 3D virtual object which does not actually exist. Even in this method, a virtual viewpoint image including a stereoscopic illusion image viewed as a 3D object from a virtual viewpoint may be generated. Furthermore, according to this method, the stereoscopic illusion model is not required to be reconverted into a substantially flat stereoscopic illusion image, and therefore, a processing amount of the image generation apparatus 300 may be reduced. However, by reconverting the stereoscopic illusion model into a substantially flat stereoscopic illusion image as described above, a virtual viewpoint image which is naturally viewed may be generated even in a case where a foreground, such as a player, overlaps on a sheet having the stereoscopic illusion image printed thereon.

Furthermore, the image generation apparatus 300 may select one of a method for performing rendering using a stereoscopic illusion model and a method for performing rendering after conversion into a substantially flat stereoscopic illusion image, which is to be used to generate a virtual viewpoint image to be output. Specifically, the image generation apparatus 300 may output a virtual viewpoint image selected from between a virtual viewpoint image generated by replacing the stereoscopic illusion image by the stereoscopic illusion model and a virtual viewpoint image generated by deforming a shape of the stereoscopic illusion image in a 3D space. For example, one of the generation methods may be automatically selected based on a processing load of the image generation apparatus, a position of the object in the foreground, and a position of the virtual viewpoint or may be selected based on a user operation.

Furthermore, the image generation apparatus 300 may output a virtual viewpoint image selected from between the virtual viewpoint image generated by deforming a shape of the stereoscopic illusion image in the 3D space and a general virtual viewpoint image generated without deforming a shape of the stereoscopic illusion image in the 3D space. Furthermore, the image generation apparatus 300 may output a virtual viewpoint image generated by a method selected from among at least three methods including the methods described above. As described above, since the method for generating a virtual viewpoint image may be selected, a processing amount is reduced when generation of a virtual viewpoint image is required to be performed for a short period of time, and conversion of the stereoscopic illusion image may be performed when a long period of time is allowed for processing so that an advertisement effect is enhanced.

Note that the method for effectively displaying a stereoscopic illusion image formed on a substantially flat object in a virtual viewpoint image has been described in the foregoing embodiment. In addition, even in a case where a virtual viewpoint image of an imaging target region where a 3D object which is viewed in a special way only when viewed in a specific direction is disposed is to be generated, the embodiment described above may be applied so that the 3D object is processed similarly to the stereoscopic illusion image, and accordingly, the 3D object is effectively viewed.

According to the foregoing embodiment, in a virtual viewpoint image generated based on images obtained by capturing a region including a specific object, such as a stereoscopic illusion image, the specific object may be displayed in a form in which content thereof is easily recognized.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2018-120186 filed Jun. 25, 2018 and No. 2018-120187 filed Jun. 25, 2018, which are hereby incorporated by reference herein in their entirety.

What is claimed is:

1. An image generation apparatus comprising:
one or more hardware processors; and
one or more memories which store instructions executable by the one or more hardware processors to cause the image generation apparatus to perform at least:
obtaining image data based on capturing images of an image capturing region from a plurality of directions with a plurality of image capturing apparatuses, wherein the image capturing region includes a flat specific object which is seen as a 3D object when viewed from a predetermined direction;
obtaining viewpoint information indicating a view direction and a position of a virtual viewpoint;
deforming the flat specific object by image processing so that the flat specific object is seen as a 3D object in a virtual viewpoint image corresponding to the view direction and the position of the virtual viewpoint indicated by the obtained viewpoint information; and
generating the virtual viewpoint image based on the obtained image data and a result of the deformation of the flat specific object.

2. The image generation apparatus according to claim 1, wherein a shape of the flat specific object in a 3D space is deformed in accordance with the position of the virtual viewpoint.

3. The image generation apparatus according to claim 2, wherein the shape of the flat specific object in the 3D space is deformed into another flat shape.

4. The image generation apparatus according to claim 2, wherein the shape of the flat specific object in a 3D space is deformed into a stereoscopic shape.

5. The image generation apparatus according to claim 4, wherein the instructions further cause the image generation apparatus to perform
generating 3D shape data indicating a shape of the flat specific object after the deformation, and
wherein the virtual viewpoint image is generated based on the obtained image data and the generated 3D shape data.

6. The image generation apparatus according to claim 1, wherein the instructions further cause the image generation apparatus to perform
identifying a shape of the flat specific object based on image data obtained based on image capturing performed in a state in which the flat specific object does not exist in the image capturing region and image data obtained based on image capturing in a state in which the flat specific object exists in the image capturing region, and
wherein the flat specific object is deformed based on a result of the identifying of the shape.

7. The image generation apparatus according to claim 1, wherein the instructions further cause the image generation apparatus to perform
identifying a shape of the flat specific object based on a result of image analysis performed on the obtained image data, and
wherein the flat specific object is deformed based on a result of the identifying of the shape.

8. The image generation apparatus according to claim 1, wherein the instructions further cause the image generation apparatus to perform
identifying a shape of the flat specific object based on a user operation of specifying a region in an image based on the obtained image data, and
wherein the flat specific object is deformed based on a result of the identifying of the shape.

9. The image generation apparatus according to claim 1, wherein an image of the flat specific object included in the virtual viewpoint image generated in accordance with the viewpoint information when a position of a viewpoint indicated by the obtained viewpoint information is in the predetermined direction relative to the flat specific object substantially matches an image of the flat specific object in an image captured by an image capturing apparatus positioned in the predetermined direction relative to the flat specific object.

10. The image generation apparatus according to claim 1, wherein an advertisement is displayed in the flat specific object.

11. The image generation apparatus according to claim 1, wherein the instructions further cause the image generation apparatus to perform:
generating, based on the obtained image data, another virtual viewpoint image which corresponds to the view direction and the position of the virtual viewpoint indicated by the obtained viewpoint information and in which a result of the deformation of the flat specific object has not been reflected, and
outputting a virtual viewpoint image selected from among a plurality of virtual viewpoint images including the virtual viewpoint image and the other virtual viewpoint image.

12. The image generation apparatus according to claim 1, wherein, based on the obtained image data, first and second virtual viewpoint images which correspond to the view direction and the position of the virtual viewpoint indicated by the obtained viewpoint information are generated,
wherein the first virtual viewpoint image is generated based on a result of deformation of a shape of the flat specific object in a 3D space into another flat shape,
wherein the second virtual viewpoint image is generated based on a result of deformation of the shape of the flat specific object in a 3D space into another stereoscopic shape, and
wherein a virtual viewpoint image selected from among a plurality of virtual viewpoint images including the first and second virtual viewpoint images is outputted.

13. An image generation method comprising:
obtaining image data based on capturing images of an image capturing region from a plurality of directions with a plurality of image capturing apparatuses, wherein the image capturing region includes a flat specific object which is seen as a 3D object when viewed from a predetermined direction;
obtaining viewpoint information indicating a view direction and a position of a virtual viewpoint;
deforming the flat specific object by image processing so that the flat specific object is seen as a 3D object in a virtual viewpoint image corresponding to the view direction and the position of the virtual viewpoint indicated by the obtained viewpoint information; and
generating the virtual viewpoint image based on the obtained image data and a result of the deformation of the flat specific object.

14. The image generation method according to claim 13, wherein a shape of the flat specific object in a 3D space is deformed in accordance with the position of the virtual viewpoint.

15. The image generation method according to claim 14, wherein the shape of the flat specific object in the 3D space is deformed into another flat shape.

16. The image generation method according to claim 13, wherein the shape of the flat specific object in a 3D space is deformed into a stereoscopic shape.

17. A non-transitory computer readable storage medium storing programs that causes a computer to execute an image generation method, the image generation method comprising:
obtaining image data based on capturing images of an image capturing region from a plurality of directions with a plurality of image capturing apparatuses, wherein the image capturing region includes a flat specific object which is seen as a 3D object when viewed from a predetermined direction;
obtaining viewpoint information indicating a view direction and a position of a virtual viewpoint;
deforming the flat specific object by image processing so that the flat specific object is seen as a 3D object in a virtual viewpoint image corresponding to the view direction and the position of the virtual viewpoint indicated by the obtained viewpoint information; and
generating the virtual viewpoint image based on the obtained image data and a result of the deformation of the flat specific object.

* * * * *